United States Patent
Liu

(10) Patent No.: US 9,064,263 B2
(45) Date of Patent: Jun. 23, 2015

(54) SYSTEM AND METHOD FOR ADVERTISEMENT PLACEMENT

(75) Inventor: Xinzhe Liu, Hangzhou (CN)

(73) Assignee: Alibaba Group Holding Limited (KY)

( * ) Notice: Subject to any disclaimer, the term of this patent is extended or adjusted under 35 U.S.C. 154(b) by 231 days.

(21) Appl. No.: 13/546,353

(22) Filed: Jul. 11, 2012

(65) Prior Publication Data

US 2013/0018729 A1 Jan. 17, 2013

(30) Foreign Application Priority Data

Jul. 13, 2011 (CN) .......................... 2011 1 0195713

(51) Int. Cl.
*G06Q 30/02* (2012.01)

(52) U.S. Cl.
CPC ............ *G06Q 30/02* (2013.01); *G06Q 30/0251* (2013.01); *G06Q 30/0277* (2013.01)

(58) Field of Classification Search
CPC .................................................. G06Q 30/252
USPC ......................................................... 705/14.5
See application file for complete search history.

(56) References Cited

U.S. PATENT DOCUMENTS

| | | |
|---|---|---|
| 8,285,590 B2 | 10/2012 | Evans |
| 8,370,343 B2 | 2/2013 | Biggs et al. |
| 8,397,259 B2 | 3/2013 | Knudson et al. |
| 2003/0208483 A1 | 11/2003 | Satomi et al. |
| 2004/0059708 A1* | 3/2004 | Dean et al. ........................ 707/1 |
| 2004/0059712 A1 | 3/2004 | Buchheit et al. |
| 2004/0093327 A1* | 5/2004 | Anderson et al. ................. 707/3 |
| 2006/0020510 A1* | 1/2006 | Vest ................................. 705/14 |
| 2007/0067215 A1 | 3/2007 | Agarwal et al. |
| 2007/0208610 A1 | 9/2007 | Pisaris-Henderson et al. |
| 2008/0052168 A1 | 2/2008 | Peters et al. |
| 2008/0201219 A1 | 8/2008 | Broder et al. |
| 2008/0313030 A1 | 12/2008 | Makeev et al. |
| 2010/0094846 A1* | 4/2010 | Rouhani-Kalleh ........... 707/705 |
| 2010/0161411 A1* | 6/2010 | Wu et al. .................... 705/14.45 |
| 2010/0235239 A1* | 9/2010 | Lam et al. .................. 705/14.58 |
| 2010/0257171 A1* | 10/2010 | Shekhawat .................... 707/738 |

FOREIGN PATENT DOCUMENTS

| | | |
|---|---|---|
| EP | 1980990 | 10/2008 |
| JP | 2007272814 | 10/2007 |
| JP | 2009266204 | 11/2009 |

(Continued)

OTHER PUBLICATIONS

English translation of CN 2011/0195713.*

(Continued)

*Primary Examiner* — Thomas M Hammond, III
*Assistant Examiner* — Breffni X Baggot
(74) *Attorney, Agent, or Firm* — Van Pelt, Yi & James LLP

(57) ABSTRACT

Advertisement placement includes: obtaining one or more advertisement query keywords; determining, using one or more computer processors, in a multi-level advertisement information store, a selection of advertisement information for placement; and presenting the selection of advertisement information to be placed at a client. The multi-level advertisement information store comprises advertisement information organized into a plurality of first-level categories, and each first-level category is associated with a respective plurality of subordinate levels of categories.

13 Claims, 5 Drawing Sheets

(56) References Cited

FOREIGN PATENT DOCUMENTS

| JP | 2010044584 | | 2/2010 | | |
|----|------------|---|--------|---|---|
| TW | 20110195713 | * | 12/2011 | ............. | G06Q 30/02 |

OTHER PUBLICATIONS

Memo: USPTO's comparison of CN 2011/0195713 with English translation provided by Applicant's Attorney concluding that these are 2 different documents.*

* cited by examiner

SYSTEM AND METHOD FOR ADVERTISEMENT PLACEMENT

CROSS REFERENCE TO OTHER APPLICATIONS

This application claims priority to People's Republic of China Patent Application No. 201110195713.4 entitled ADVERTISING METHOD, ADVERTISEMENT SERVER, AND ADVERTISING SYSTEM filed Jul. 13, 2011 which is incorporated herein by reference for all purposes.

FIELD OF THE INVENTION

The present application relates to the field of Internet technology. In particular, it relates to a system and method for advertisement placement.

BACKGROUND OF THE INVENTION

With the rapid development of Internet technology, the Internet has become a mainstream marketing medium. Internet advertising offers a number of compelling advantages over traditional advertising formats. In particular, Internet advertising is effective because it is both proactive and interactive. Moreover, advertising over the Internet appeals to a broad and diverse audience but is still relatively inexpensive. Internet advertising has become an increasingly popular choice for companies and merchants because of its high performance-to-price ratio.

Traditionally, Internet advertising systems employ basic query keyword matching to select advertisements for placement. This conventional method for Internet advertisement placement starts by acquiring keywords. The acquired keywords are then used to match and select from a database a set of advertisements for placement. Finally, the selected advertisements are placed onto a webpage.

Advertisements selected according to the conventional method tend to be limited in product range and diversity. For example, a search for "cotton T-shirt" could have relevant advertisements under a number of different product categories such as Women's Apparel, Men's Apparel, Children's Apparel, and Sports Apparel. The conventional method, however, is not guaranteed to select advertisements that would adequately cover the same range and variety of product categories. Consequently, conventionally placed Internet advertisements are ineffective and have low click-through rate. Furthermore, storing and transmitting ineffective advertisements with low click-through rate is a waste of server and network resources.

BRIEF DESCRIPTION OF THE DRAWINGS

Various embodiments of the invention are disclosed in the following detailed description and the accompanying drawings.

DETAILED DESCRIPTION

Figure 1:
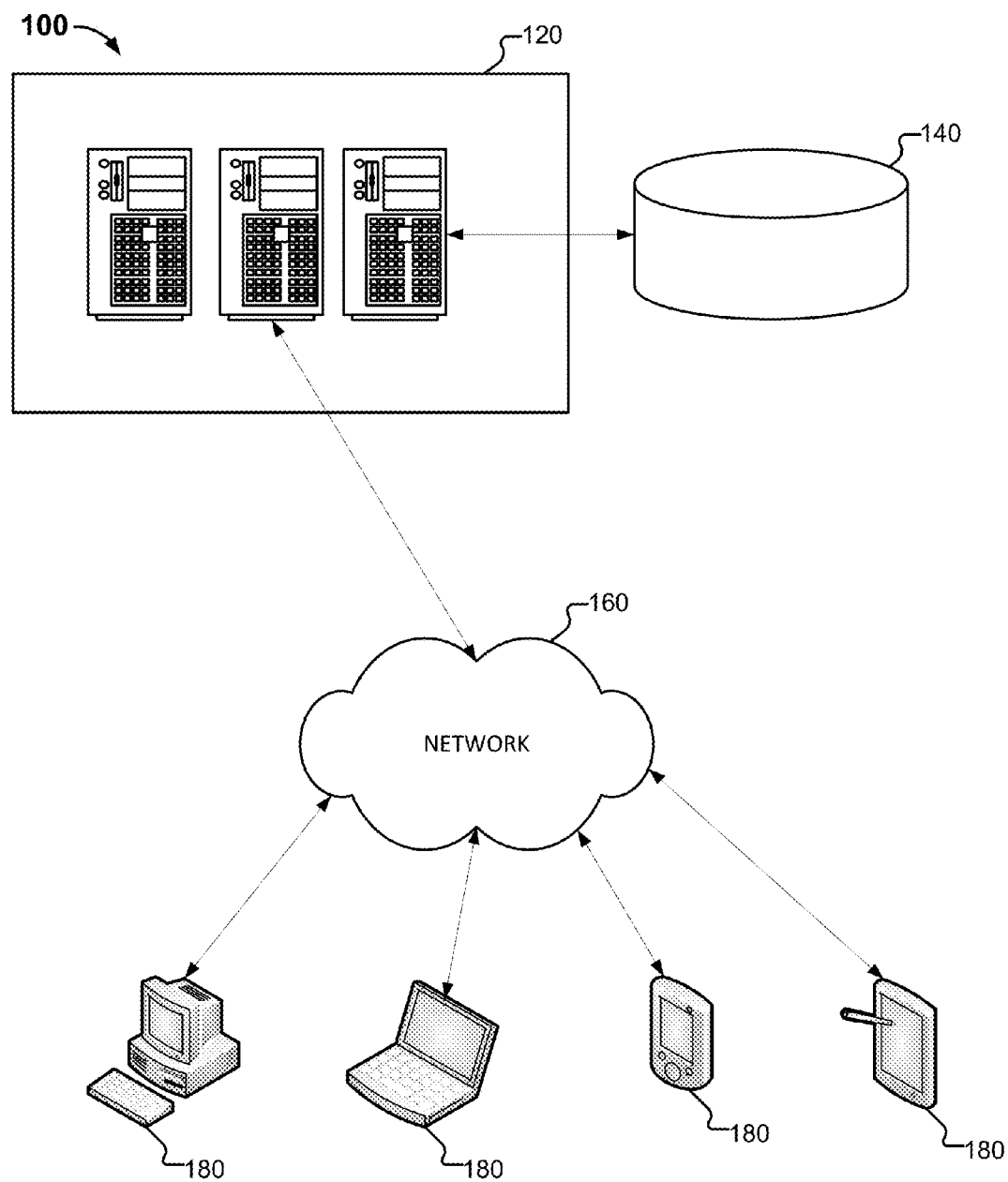
FIG. 1 is a system diagram depicting an embodiment of the advertisement placement system 100.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method and system for Internet advertisement placement are disclosed. One embodiment of the invention relates to a multi-level advertisement information store. The multi-level advertisement information store includes advertisement information (e.g., content of various types of advertisements, keywords associated with the advertisements, etc.) organized into multiple levels of categories. In accordance with an aspect of the present embodiments, advertisement placement includes determining one or more advertisement query keywords. In some embodiments, candidate advertisement information that corresponds to the one or more advertisement query keywords is found in the multi-level advertisement information store. In some embodiments, advertisement information for placement is selected from the candidate advertisement information based at least in part on the correlation values between the one or more advertisement query keywords and the candidate advertisement information. In some embodiments, a preset number of candidate advertisement information is selected from each category within a particular level. In some embodiments, advertisement information is selected among the candidate advertisement information, and sent to the client for placement on webpages that a user at the client is browsing. As used herein, placement refers to presenting the graphics, sounds, or other sensory displays of the advertisement information on a client device.

FIG. 1 is a system diagram depicting an embodiment of the advertisement placement system 100.

In the example shown, advertisement placement system 100 includes an advertisement server 120 and a multi-level advertisement information store 140. In some embodiments, advertisement server 120 includes one or more devices having one or more processors coupled to one or more memories. In various embodiments, advertisement server 120 includes one or more interfaces configured to receive user inputs, such as user inputs sent by one or more clients 180 over network 160, which may be the Internet or other communication network. Examples of a communication interface include, without limitations, external connections such as a port, cable, wired or wireless network interface card, etc., and internal connections such as a communication bus. In some embodiments, client 180 is a computing device such as a computer, a mobile device, a tablet, or any other appropriate device. In some embodiments, advertisement server 120 has access to the multi-level advertisement information store 140. In various embodiments, the multi-level advertisement information store 140 is a database that stores advertisement information.

Figure 2:
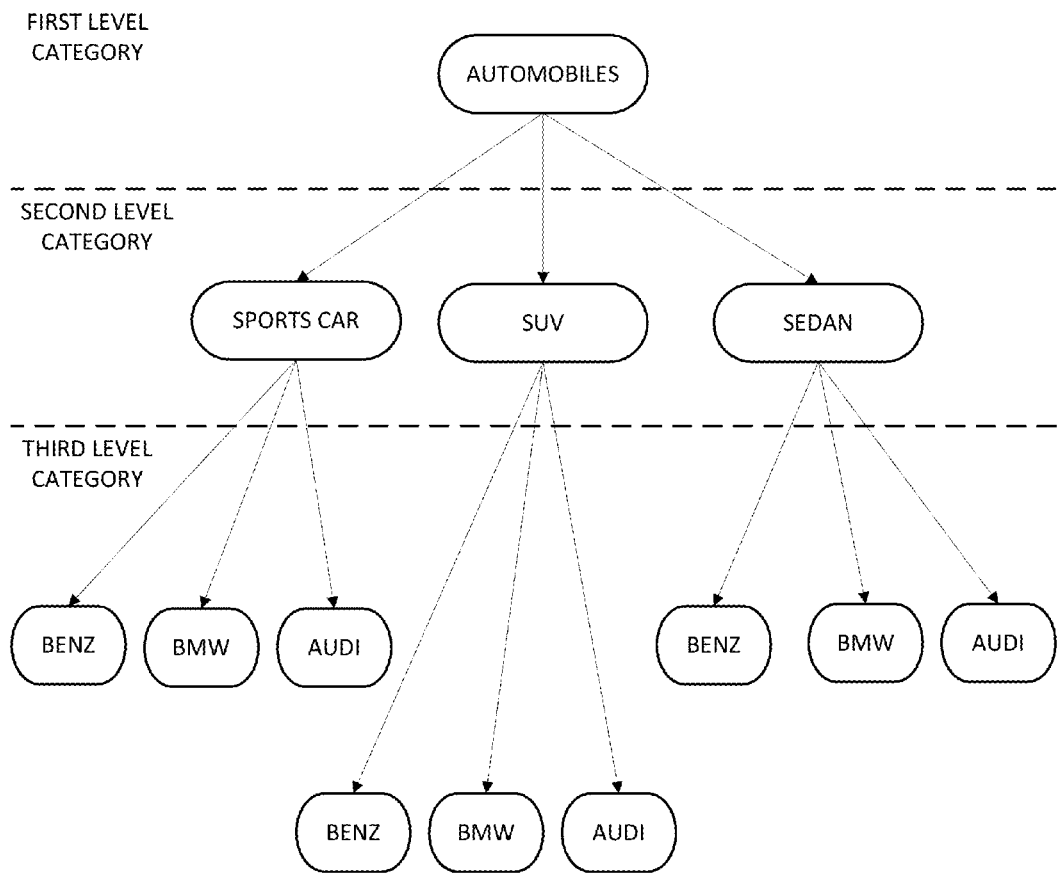
FIG. 2 is a structural diagram depicting an embodiment of the advertisement information stored in the multi-level advertisement information store.

FIG. 2 is a structural diagram depicting an example of a part of the advertisement information stored in the multi-level advertisement information store.

In some embodiments, advertisement information stored in the multi-level advertisement information store is organized into first-level categories (e.g., Apparel, Food, Automobiles, etc.) and stored in separate tree data structures. The root nodes of each tree data structure correspond to various first-level categories. In some embodiments, advertisement information within each first-level category is further organized into various subordinate levels of categories. The intermediate nodes and the leaf nodes of the tree data structure correspond to the various subordinate levels of categories. In some embodiments, advertisement information is stored at the leaf nodes. In the example shown, the first-level category "Automobile" can be subdivided into second-level categories for different body styles or types of automobiles (e.g., sports car, SUV, sedan, etc.). The second-level categories are further subdivided into third-level categories. For example, the second level category "sedan" is subdivided to form third-level categories that correspond to different makes of sedans such as Mercedes-Benz, BMW, Audi, etc. In this example, the third-level categories are leaf nodes that store advertisement information. For example, the third-level category "BMW" would contain advertisement information that corresponds to BMW sedans. The category and subcategories are shown for purposes of illustration in FIG. 2, and different category and subcategories can be configured in other embodiments.

In some embodiments, advertisement information stored in the multi-level advertisement information store is organized into to multiple levels of categories. In some embodiments, advertisement information within a first-level category can be organized and stored according to any number of subordinate levels of categories. For example, the first-level category "Automobiles" can have only second-level categories for different body styles of automobiles. Alternately, the first-level category "Automobile" can have second-level and third-level categories for vehicle body style and make, respectively.

In some embodiments, advertisement server 120 obtains one or more advertisement query keywords that are pertinent to a user at client 180. In some embodiments, advertisement server 120 determines advertisement query keywords that are pertinent to the user based at least in part on search terms that the user is inputting into a search engine at client 180. For example, a user Alice entered into a search engine search terms that include "manual transmission." In some embodiments, advertisement server 120 determines one or more advertisement query keywords based at least in part on the user's online activities, such as the content of webpages that the user at the client is browsing. For example, Alice is browsing webpages that concern "manual transmission," such as product specifications of manual transmission cars and help pages regarding manual transmission engines. Based on Alice's Internet browsing history and/or on her search terms, advertisement server 120 determines that "manual transmission" is an advertisement query keyword pertinent to Alice. In some embodiments, the advertisement query keywords are determined at the client 180.

In some embodiments, advertisement server 120 assigns weights to advertisement query keywords determined to be pertinent to the user. In some embodiments, the weight assigned to an advertisement query keyword indicates a measure of the degree of relevance of the advertisement query keyword. In various embodiments, different techniques for assigning weights to the individual advertisement query keywords could be used. For example, the assigned weight may be based at least in part on the user's historical response rate to advertisements containing the advertisement query keyword. For instance, if a user has response rates of 0.01 and 0.02 to advertisements displayed in response to the keywords "manual transmission" and "hybrid engine," respectively, then a weight of 0.01 is assigned to "manual transmission" and a weight of 0.02 is assigned to "hybrid engine." The weights can be normalized or otherwise adjusted. In some embodiments, the weight assigned to an advertisement query keyword is based at least in part on an historical usage frequency of the keyword for all users in the system. In some embodiments, the weight is a fixed value assigned by a system operator.

Figure 3:
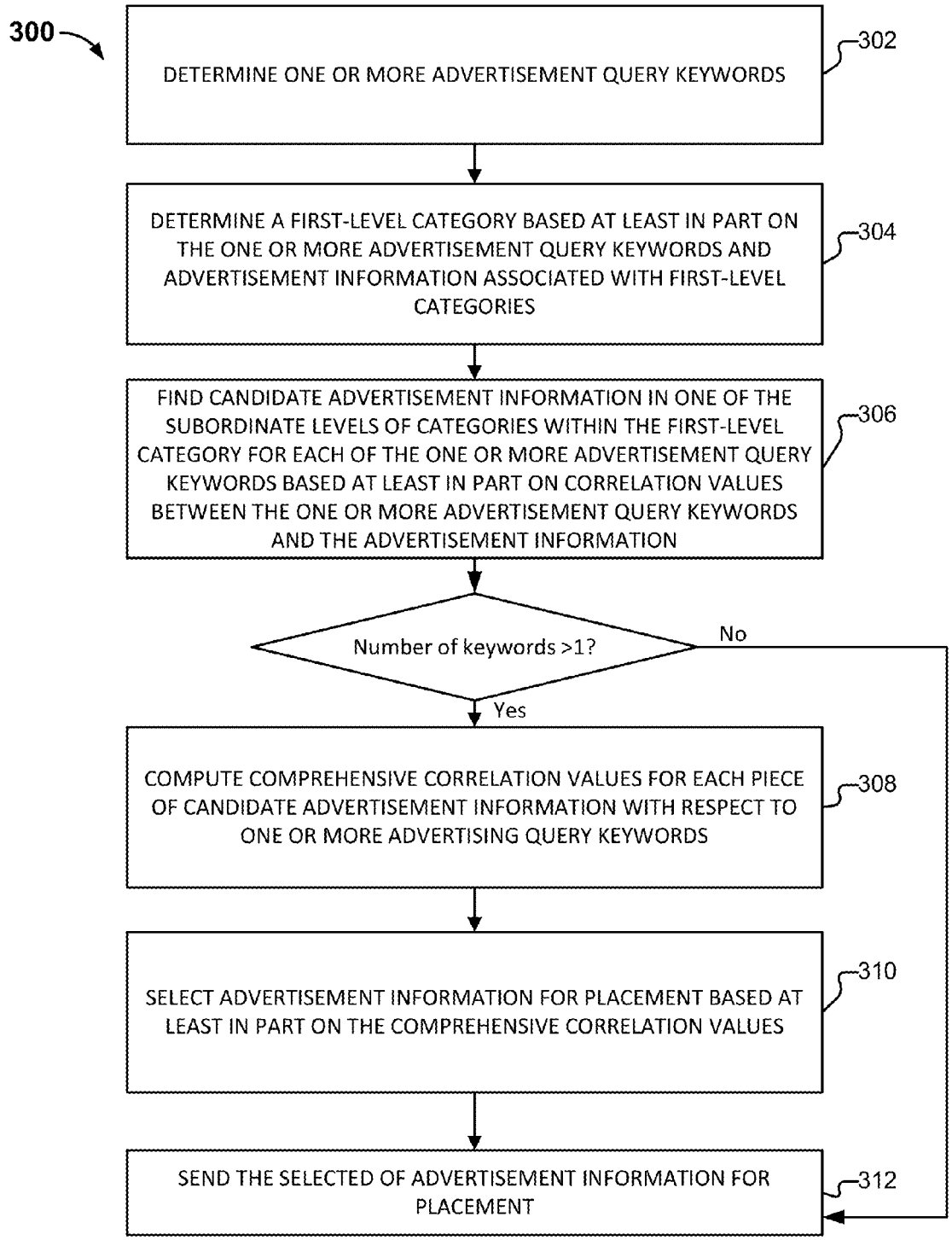
FIG. 3 is a flow diagram depicting an embodiment of the process for advertisement placement.

FIG. 3 is a flow diagram depicting an embodiment of a process for advertisement placement. In some embodiments, process 300 may be performed on system 100 (e.g., server 120) of FIG. 1.

At 302, one or more advertisement query keywords are obtained. As used herein, an advertisement query keyword can include a single word, or a key phrase comprising more than one word. The advertisement query keywords can be obtained according to, for example, one or more user search queries and/or user activities as described above.

At 304, a first-level category is determined based at least in part on the one or more advertisement query keywords and on the advertisement information associated with first-level categories in the multi-level advertisement information store 140. In some embodiments, each first-level category is associated with a set of keywords that are either manually preset or obtained via log analysis, machine classification, or other mechanisms. For example, the Automobile category is associated with a number of keywords that relate to automobiles (e.g., "manual transmission," "automatic transmission," "SUV," "Sedan," "Van," "BMW," "Mercedes," "Toyota," "Ford," and many more). Advertisement query server 120 determines a first-level category based at least in part on the number of matches to the advertisement query keywords. For example, suppose the advertisement query keywords include "manual transmission," "BMW," and "X5." If all three keywords match the keywords associated with the "Automobile" category, but only the keywords of "manual transmission" and "BMW" match the keywords associated with the "Repair Service" category, then the "Automobile" category is deemed to be the matching first-level category instead of "Repair Service." In some embodiments, other factors such as weights computed based on historical user response rate to advertisements in each category are used to determine the first-level category.

At 306, candidate advertisement information that corresponds to each of the one or more advertisement query keywords is found in one of the subordinate levels of categories within the first-level category determined at 304.

In some embodiments, advertisement server 120 searches for candidate advertisement information based at least in part on a correlation value between the advertisement query keyword and each piece of the advertisement information. The correlation value indicates the extent of relatedness of the advertisement information and the query keyword. In various embodiments, different ways of computing the correlation value are possible and can yield different results. In some embodiments, the correlation value is pre-assigned (typically by the system administrator/operator). For example, an advertisement that has the keyword of "BMW X5" but does not include the keyword "manual transmission" can be set to have a correlation value of 0.08 with respect to the query keyword "manual transmission"; another advertisement that includes the keyword of "manual transmission Mercedes SUV" is set to have a correlation value of 0.15 with respect to the same query keyword "manual transmission;" a third advertisement that includes the keyword "manual transmission" can be set to have a correlation value of 0.01 with respect to the same query keyword. In some embodiments, the correlation value is computed according to standard statistical techniques (such as the Pearson Product-Moment Correlation Coefficient) rather than pre-assigned.

In some embodiments, in order to ensure product-category diversity in the advertisement information to be placed, candidate advertisement information includes a preset number of advertisement information from each category in a designated category level. In some embodiments, candidate advertisement information includes a preset number of advertisement information that has the highest correlation values with respect to the advertisement query keyword.

Assume that M pieces of advertisement information are desired for display and that there are N subordinate categories. If there is a single query keyword, then the number of advertisement information to be selected from each subordinate category is M/N. For example, given the advertisement query keyword of "manual transmission", M of 30, and N of 3, the advertisement server 120 searches for and finds 30/3=10 pieces of candidate advertisement information that have the highest correlation value with respect to the query keyword "manual transmission" from each of the three second-level categories (sports car, SUV, and sedan), resulting in a total of 30 pieces of candidate advertisement information.

As another example, given the advertisement query keywords "manual transmission" and "BMW," advertisement server 120 searches for and finds 10 pieces of candidate advertisement information that corresponds to "manual transmission" from each of the three second-level categories sports car, SUV, and sedan, resulting in 30 pieces of candidate advertisement information. The selection from each category can be made based on the degree of match (for example, the number of times each keyword appears in each piece of advertisement information), and the best matches are selected as the candidates. Advertisement server 120 also searches for and finds 10 pieces of candidate advertisement information that corresponds to "BMW" from each of the three second-level categories (sports car, SUV, and sedan). This results in an additional 30 pieces of candidate advertisement information.

If there is a single advertisement query keyword, then the candidate advertisement information can be the same as the advertisement information to be displayed and control proceeds to 312. However, if there is more than one advertisement query keyword, then, at 308, further selection is made among the candidate advertisement information. In this example, a comprehensive correlation value is computed for each piece of candidate advertisement information found at 306.

In some embodiments, in order to compute the comprehensive correlation value, advertisement server 120 first computes correlation values for candidate advertisement information for each advertisement query keyword with respect to all the other advertisement query keywords. For example, advertisement server 120 computes the correlation values between advertisement query keyword "manual transmission" and each piece of candidate advertisement information that corresponds to "BMW." Likewise, advertisement server 120 computes the correlation values between advertisement query keyword "BMW" and the candidate advertisement information that corresponds to "manual transmission."

The correlation values are then multiplied with weights that are associated with each advertisement query keyword. The weights can be assigned by the system operator or be computed based on, for example, analysis of past user activity logs. For example, "manual transmission" and "BMW" have weights of 0.7 and 0.4, respectively. In some embodiments, the weights are assigned by the system operator. In some embodiments, the weights are computed based on how frequently the users in the system responded to ads displayed in response to each query keyword. For example, the keyword "manual transmission" gets a higher weight than "BMW" because users historically had a higher click-through rate in response to ads displayed in connection with the former than with the latter. Other ways to assign or calculate the weights are possible. In some embodiments, for each piece of candidate advertisement information, a comprehensive correlation value is the weighted sum of the individual correlation values between the candidate advertisement query information with respect to each of the advertisement query keywords. In the earlier example, the comprehensive correlation value for a candidate advertisement information X is the sum of the weighted correlation value of the candidate advertisement information X to "manual transmission" and the weighted correlation value of the candidate advertisement information X to "BMW" (i.e., comprehensive correlation of X=0.7*correlation of ad X to "manual transmission"+ 0.4*correlation of ad X to "BMW").

At 310, advertisement information for placement is selected based at least in part on the comprehensive correlation values computed at 308 for each piece of candidate advertisement information.

In some embodiments, the selection of advertisement information for placement includes a predetermined M total number of pieces of advertisement information. In some embodiments, if there is N number of categories in a designated category level, advertisement server 120 selects M/N number of candidate advertisement information from each of the N categories in a designated category level. In some embodiments, candidate advertisement information from each category with the highest comprehensive correlation values to the advertisement query keyword is selected as advertisement information for placement.

At 312, the selection of advertisement information determined at 310 is sent to the client to be placed on webpages that a user at the client is browsing.

Figure 4:
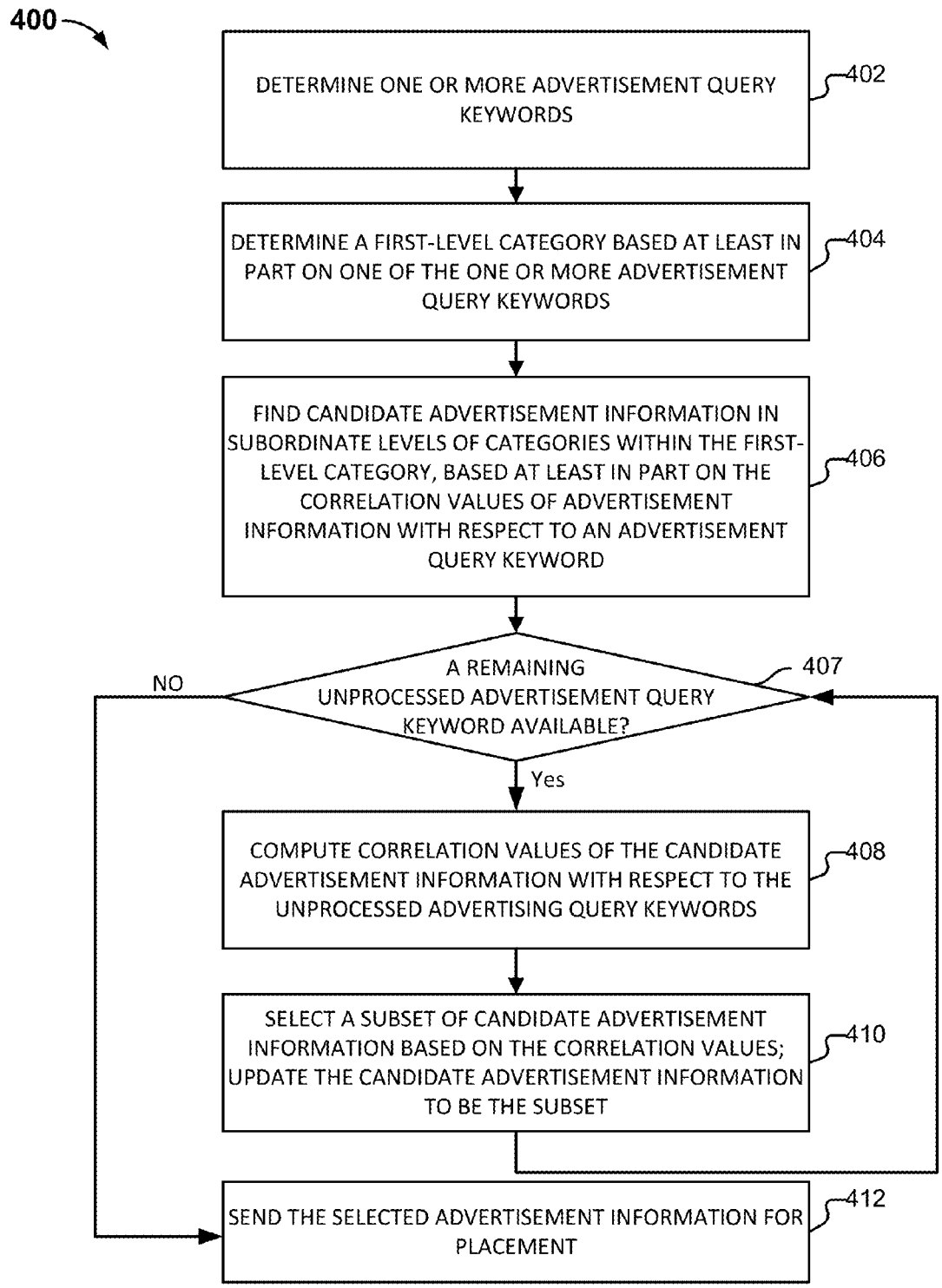
FIG. 4 is a flow diagram depicting an embodiment of the process for advertisement placement.

FIG. 4 is a flow chart of another embodiment of a process for advertisement placement. In some embodiments, process 400 may be performed on system 100 (e.g., server 120) of FIG. 1.

At 402, one or more advertisement query keywords are determined. In some embodiments, an advertisement query keyword is a key phrase comprising more than one word.

At 404, a first-level category is determined based at least in part on one of the one or more advertisement query keywords and on the advertisement information associated with first-level categories in the multi-level advertisement information store 140. For example, for the advertisement query keywords "manual transmission," "BMW," and "X5," advertisement server 120 determines a first-level category of "Automobiles."

At 406, candidate advertisement information that corresponds to one of the advertisement query keywords is found in the subordinate levels of categories within the first-level category determined at 404. In some embodiments, candidate advertisement information is found based at least in part on a correlation value between the candidate advertisement information and the advertisement query keyword. In some embodiments, candidate advertisement information includes a preset number of advertisement information that has the highest correlation value with respect to the advertisement query keyword. In some embodiments, in order to ensure product-category diversity in the advertisement information to be placed, candidate advertisement information includes a preset number of advertisement information from each category in a designated category level. For example, advertisement server 120 searches for and finds 10 pieces of candidate advertisement information that corresponds to "manual transmission" from each of the three second-level categories (i.e., sports car, SUV, and sedan) under "Automobile," giving a total of 30 pieces of candidate advertisement information.

At 407, it is determined if a remaining unprocessed advertisement query keyword is available. If no, control is passed to 412; otherwise, a correlation value is computed for each piece of candidate advertisement information with respect to the remaining unprocessed advertisement query keyword, and the unprocessed advertisement query keyword becomes processed. For example, if 30 pieces of candidate advertisement information were found to correspond to the advertisement query keyword "manual transmission" in step 406, then, in step 408, advertisement server 120 computes the correlation values of these 30 pieces of candidate advertisement information with respect to the advertisement query keyword "BMW."

In various embodiments, different ways to calculate the correlation between two keywords are possible. For example, assume that there are a total of P pieces of advertisements in the category of Automobile, and the number of ads that include the keyword A (e.g., "manual transmission") is Pa, the number of ads that include the keyword B (e.g., "BMW") is Pb, and the number of ads that includes both keywords A and B (e.g., both "manual transmission" and "BMW") is Pab, then the correlation value between the keyword "manual transmission" and the keyword "BMW" is computed according to:

$$Corr_{AB} = Pab/(Pa+Pb-Pab)$$

In this example, each time after the correlation values between an advertisement query keyword and the candidate advertisement information have been computed, advertisement server selects a subset of the candidate advertisement information that have the highest correlation values. At 410, the candidate advertisement information set is updated based on the computed correlation values. Specifically, a subset of candidate advertisement information is selected to form the updated candidate advertisement information set. For example, the top 20 pieces of advertisement information with the highest correlation values with respect to the advertisement query keyword "BMW" are selected to form the updated candidate advertisement set.

Steps 408 and 410 are repeated for each remaining advertisement query keyword, until all the advertisement query keywords are processed. Continuing the earlier example, after selecting the top 20 pieces of advertisement information based on correlation to the computing the comprehensive correlation values each piece of candidate advertisement information with respect to advertisement query keyword "BMW," at 408, advertisement server 120 computes the correlation values for each of the 20 pieces of candidate advertisement information with respect to the remaining advertisement query keyword "X5." At 410, the top 10 of the 20 pieces of candidate advertisement information that have the highest correlation values with respect to "X5" are selected.

In some embodiments, in order to ensure product category diversity in the advertisements information to be placed, the candidate advertisement information selected at each stage of computation includes a preset number of candidate advertisement information from each category in a designated category-level (e.g., SUV, sedan, and sports car each contribute to ⅓ of the candidate advertisement information, although other distributions are also possible). In some embodiments, the selection of advertisement information to be placed includes a predetermined M total number of pieces of advertisement information. In some embodiments, if there is N number of categories in a designated category level, advertisement server 120 selects M/N number of candidate advertisement information from each of the N categories in a designated category level. In some embodiments, candidate advertisement information from each category with the highest comprehensive correlation values to the advertisement query keyword is selected as advertisement information for placement.

When there are no more advertisement query keywords remaining, control is transferred to 412.

At 412, advertisement information for placement selected at 410 is sent to the client to be placed on webpages that a user at the client is browsing.

Figure 5:
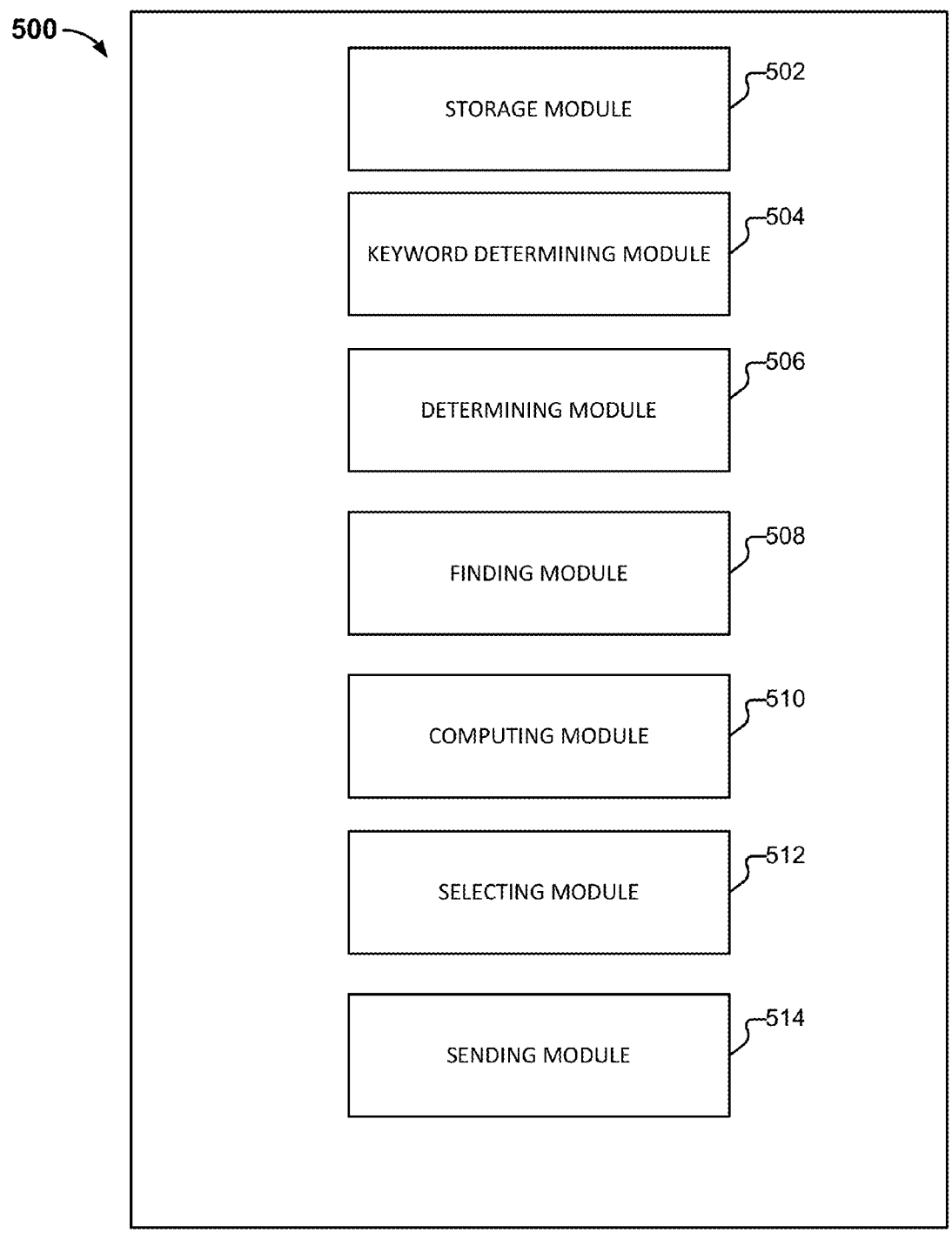
FIG. 5 is a block diagram depicting an embodiment of the system for advertisement placement.

FIG. 5 is a block diagram depicting an embodiment of the system 500 for advertisement placement. As shown in FIG. 5, the advertisement placement system 500 includes: a storage module 502, to store advertisement information; a keyword determining module 504, to determine one or more advertisement query keywords that are relevant to a user; a determining module 508, to determine, based on the one or more advertisement query keywords, a first-level category of advertisement information; a searching module 510, to find candidate advertisement information in the storage module 502 that corresponds to the advertisement query keywords within one of the subordinate levels of categories within the first-level category; a computing module 512, to compute correlation values between each piece of candidate advertisement information found by the finding module 510 and the advertisement query keywords; a selecting module 614, to select advertisement information for placement based at least in part on the correlation values computed by the computing module 512; and a sending module 516, to send the advertisement information selected by the selecting module 514 for placement.

The modules described above can be implemented as software components executing on one or more general-purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for advertisement placement, comprising:
obtaining one or more advertisement query keywords;
determining, using one or more computer processors, in a multi-level advertisement information store, a selection of advertisement information for placement; and
presenting the selection of advertisement information to be placed at a client; wherein:
the multi-level advertisement information store comprises advertisement information organized into a plurality of first-level categories, and each first-level category is associated with a respective plurality of subordinate levels of categories; and
determining, in the multi-level advertisement information store, the selection of advertisement information for placement includes:
determining a first-level category based at least in part on the one or more advertisement query keywords;
locating in each of the plurality of subordinate levels of categories associated with the first-level category, candidate advertisement information that corresponds to the one or more advertisement query keywords, comprising:
preassigning a correlation value between the advertisement query keyword and each piece of the advertising information, the correlation value relating to an extent of relatedness of a piece of the advertising information and the advertisement query keyword;
determining, for the each of the plurality of subordinate levels of the categories associated with the first-level category, a predetermined number of candidate advertisement information based on the correlation value, the predetermined number of candidate advertisement information being two or more; and
computing a comprehensive correlation value for the candidate advertisement information, the comprehensive correlation value relating to a sum of a first correlation value of a first piece of the candidate advertisement information weighted by a first weight and a second correlation value of a second piece of the candidate advertisement information weighted by a second weight, the first piece of the candidate advertisement information being different from the second piece of the candidate advertisement information, and the first weight being different from the second weight, the first correlation value being calculated based on a Pearson Product-Moment Correlation technique, the second correlation value being calculated based on a Pearson Product-Moment Correlation technique, the first correlation value of the first piece of the candidate advertisement information weighted by the first weight including the first correlation value of the first piece of the candidate advertisement information being multiplied by the first weight, the second correlation value of the second piece of the candidate advertisement information weighted by the second weight including the second correlation value of the second piece of the candidate advertisement information being multiplied by the second weight, and the first and second weights being normalized before being multiplied; and
making the selection of advertisement information for placement based on the comprehensive correlation value of the candidate advertisement information, wherein the making of the selection of advertisement information for placement comprises selecting the candidate advertisement information from each category, the selected candidate advertisement information from the each category having a higher comprehensive correlation value than a comprehensive correlation value of another candidate advertisement information from the each category.

2. The method of claim 1, wherein the one or more advertisement query keywords are obtained based on a user input into a search engine.

3. The method of claim 1, wherein the one or more advertisement query keywords are obtained based on a user's online activities.

4. The method of claim 1, wherein each advertisement query keyword includes one or more words.

5. The method of claim 1, wherein the first-level category is determined based on matching keywords and the one or more advertisement query keywords, the keywords being associated with a first-level category of the multi-level advertisement information store.

6. The method of claim 1, wherein the plurality of candidate advertisement information includes at least some advertisement information from each subordinate category in a designated category level.

7. The method of claim 1, wherein:
the one or more advertisement query keywords include a plurality of advertisement query keywords, and
locating the candidate advertisement information and making the selection of advertisement information for placement includes:
determining a first set of correlation values of advertisement information in the plurality of subordinate levels of categories with respect to a first advertisement query keyword;
selecting a set of candidate advertisement information based at least in part on the first set of correlation values;
determining a second set of correlation values of the first set of candidate advertisement information with respect to a second advertisement query keyword; and
determining an updated set of candidate advertisement information based on the second set of correlation values.

8. The method of claim 1, wherein the selection of advertisement information for placement comprises a specified number of pieces of candidate advertisement information that are from each subordinate level of category, and that have the highest comprehensive correlation values.

9. A system for advertisement placement, comprising:
one or more processors configured to:
  obtain one or more advertisement query keywords;
  determine, using one or more computer processors, in a multi-level advertisement information store, a selection of advertisement information for placement; and
  present the selection of advertisement information to be placed at a client; wherein:
  the multi-level advertisement information store comprises advertisement information organized into a plurality of first-level categories, and each first-level category is associated with a respective plurality of subordinate levels of categories; and
  to determine, in the multi-level advertisement information store, the selection of advertisement information for placement includes:
    to determine a first-level category based at least in part on the one or more advertisement query keywords;
    to locate in each of the plurality of subordinate levels of categories associated with the first-level category, candidate advertisement information that corresponds to the one or more advertisement query keywords, comprising:
      to preassign a correlation value between the advertisement query keyword and each piece of the advertising information, the correlation value relating to an extent of relatedness of a piece of the advertising information and the advertisement query keyword;
      to determine, for the each of the plurality of subordinate levels of the categories associated with the first-level category, a predetermined number of candidate advertisement information based on the correlation value, the predetermined number of candidate advertisement information being two or more; and
      to compute a comprehensive correlation value for the candidate advertisement information, the comprehensive correlation value relating to a weighted sum of a first correlation value of a first piece of the candidate advertisement information weighted by a first weight and a second correlation value of a second piece of the candidate advertisement information weighted by a second weight, the first piece of the candidate advertisement information being different from the second piece of the candidate advertisement information, and the first weight being different from the second weight, the first correlation value being calculated based on a Pearson Product-Moment Correlation technique, the second correlation value being calculated based on a Pearson Product-Moment Correlation technique, the first correlation value of the first piece of the candidate advertisement information weighted by the first weight including the first correlation value of the first piece of the candidate advertisement information being multiplied by the first weight, the second correlation value of the second piece of the candidate advertisement information weighted by the second weight including the second correlation value of the second piece of the candidate advertisement information being multiplied by the second weight, and the first and second weights being normalized before being multiplied; and
    to make the selection of advertisement information for placement based on the comprehensive correlation value of the candidate advertisement information, wherein the making of the selection of advertisement information for placement comprises selecting the candidate advertisement information from each category, the selected candidate advertisement information from the each category having a higher comprehensive correlation value than a comprehensive correlation value of another candidate advertisement information from the each category; and
  a memory coupled to the one or more processors and configured to provide the processor with instructions.

10. The system of claim 9, wherein the plurality of candidate advertisement information includes at least some advertisement information from each subordinate category in a designated category level.

11. The system of claim 9, wherein:
  the one or more advertisement query keywords include a plurality of advertisement query keywords, and
  to locate the candidate advertisement information and making the selection of advertisement information for placement includes:
    to determine a first set of correlation values of advertisement information in the plurality of subordinate levels of categories with respect to a first advertisement query keyword;
    to select a set of candidate advertisement information based at least in part on the first set of correlation values;
    to determine a second set of correlation values of the first set of candidate advertisement information with respect to a second advertisement query keyword; and
    to determine an updated set of candidate advertisement information based on the second set of correlation values.

12. A computer program product for advertisement placement, the computer program product being embodied in a non-transitory computer readable storage medium and comprising computer instructions for:
  obtaining one or more advertisement query keywords;
  determining, using one or more computer processors, in a multi-level advertisement information store, a selection of advertisement information for placement; and
  presenting the selection of advertisement information to be placed at a client; wherein:
  the multi-level advertisement information store comprises advertisement information organized into a plurality of first-level categories, and each first-level category is associated with a respective plurality of subordinate levels of categories; and
  determining, in the multi-level advertisement information store, the selection of advertisement information for placement includes:
    determining a first-level category based at least in part on the one or more advertisement query keywords;
    locating in each of the plurality of subordinate levels of categories associated with the first-level category, candidate advertisement information that corresponds to the one or more advertisement query keywords, comprising:
      preassigning a correlation value between the advertisement query keyword and each piece of the advertising information, the correlation value relating to an extent of relatedness of a piece of the advertising information and the advertisement query keyword;

determining, for the each of the plurality of subordinate levels of the categories associated with the first-level category, a predetermined number of candidate advertisement information based on the correlation value, the predetermined number of candidate advertisement information being two or more; and computing a comprehensive correlation value for the candidate advertisement information, the comprehensive correlation value relating to a weighted sum of a first correlation value of a first piece of the candidate advertisement information weighted by a first weight and a second correlation value of a second piece of the candidate advertisement information weighted by a second weight, the first piece of the candidate advertisement information being different from the second piece of the candidate advertisement information, and the first weight being different from the second weight, the first correlation value being calculated based on a Pearson Product-Moment Correlation technique, the second correlation value being calculated based on a Pearson Product-Moment Correlation technique, the first correlation value of the first piece of the candidate advertisement information weighted by the first weight including the first correlation value of the first piece of the candidate advertisement information being multiplied by the first weight, the second correlation value of the second piece of the candidate advertisement information weighted by the second weight including the second correlation value of the second piece of the candidate advertisement information being multiplied by the second weight, and the first and second weights being normalized before being multiplied; and making the selection of advertisement information for placement based on the comprehensive correlation value of the candidate advertisement information, wherein the making of the selection of advertisement information for placement comprises selecting the candidate advertisement information from each category, the selected candidate advertisement information from the each category having a higher comprehensive correlation value than a comprehensive correlation value of another candidate advertisement information from the each category.

13. The method of claim 1, wherein each weight relates to 1) a historical response rate to advertisements including the advertisement query keyword, 2) a historical usage frequency of the advertisement query keyword, or 3) a fixed value assigned by a system operator.

* * * * *